Oct. 27, 1964   E. P. RILEY ETAL   3,153,985
WINDSHIELD WIPER
Filed April 6, 1959   4 Sheets-Sheet 1
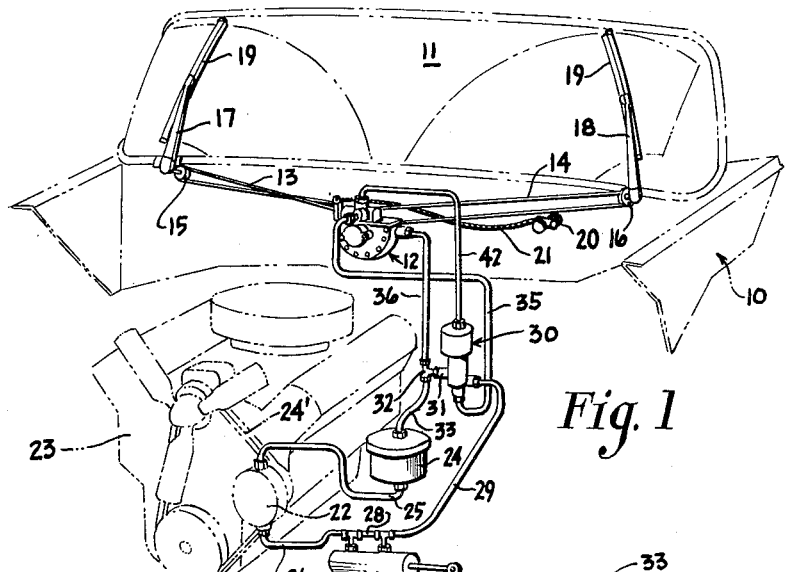
Fig. 1
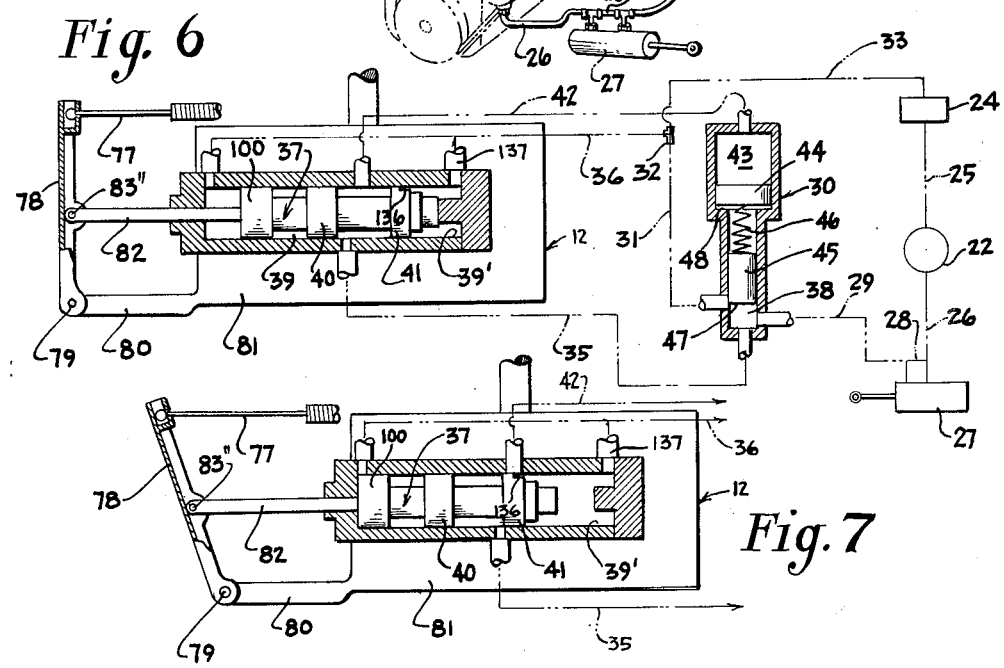
Fig. 6
Fig. 7
INVENTORS
EUGENE P. RILEY AND
BY   ANTHONY R. D'ALBA
Bean Brooks Buckley + Bean.
ATTORNEYS Oct. 27, 1964   E. P. RILEY ETAL   3,153,985
WINDSHIELD WIPER
Filed April 6, 1959   4 Sheets-Sheet 2
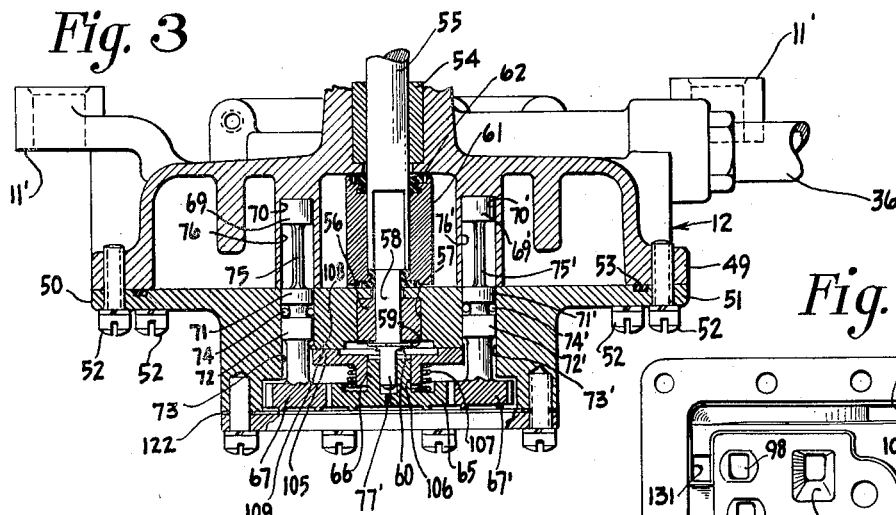
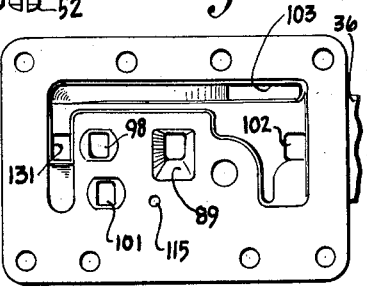
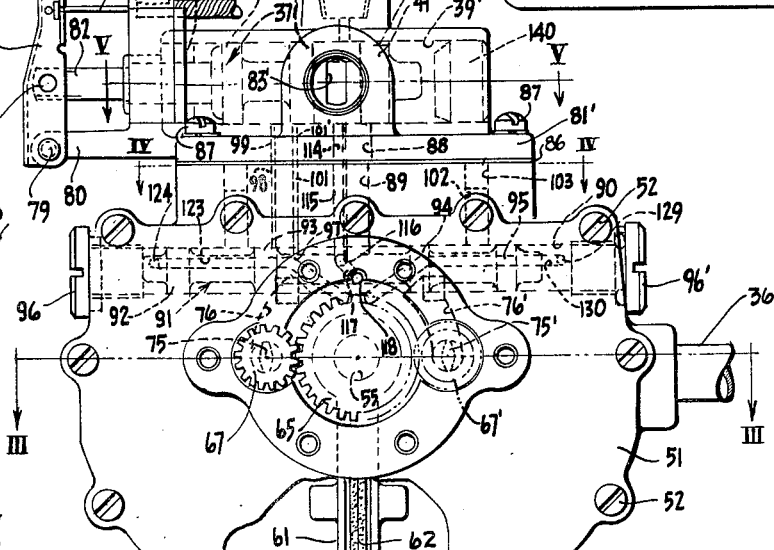
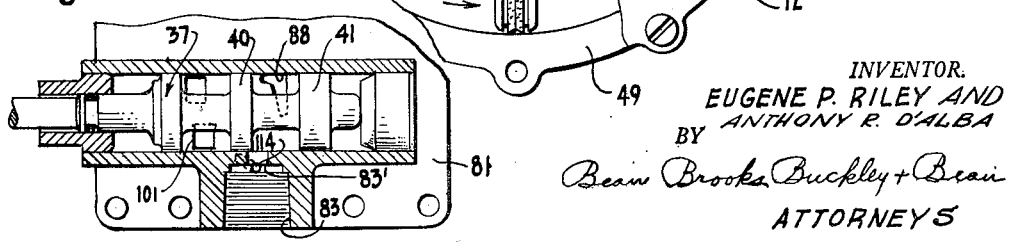
INVENTOR.
EUGENE P. RILEY AND
BY ANTHONY R. D'ALBA
Bean Brooks Buckley + Bean
ATTORNEYS INVENTOR.
EUGENE P. RILEY AND
BY ANTHONY R. D'ALBA
Bean Brooks Buckley & Bean.
ATTORNEYS

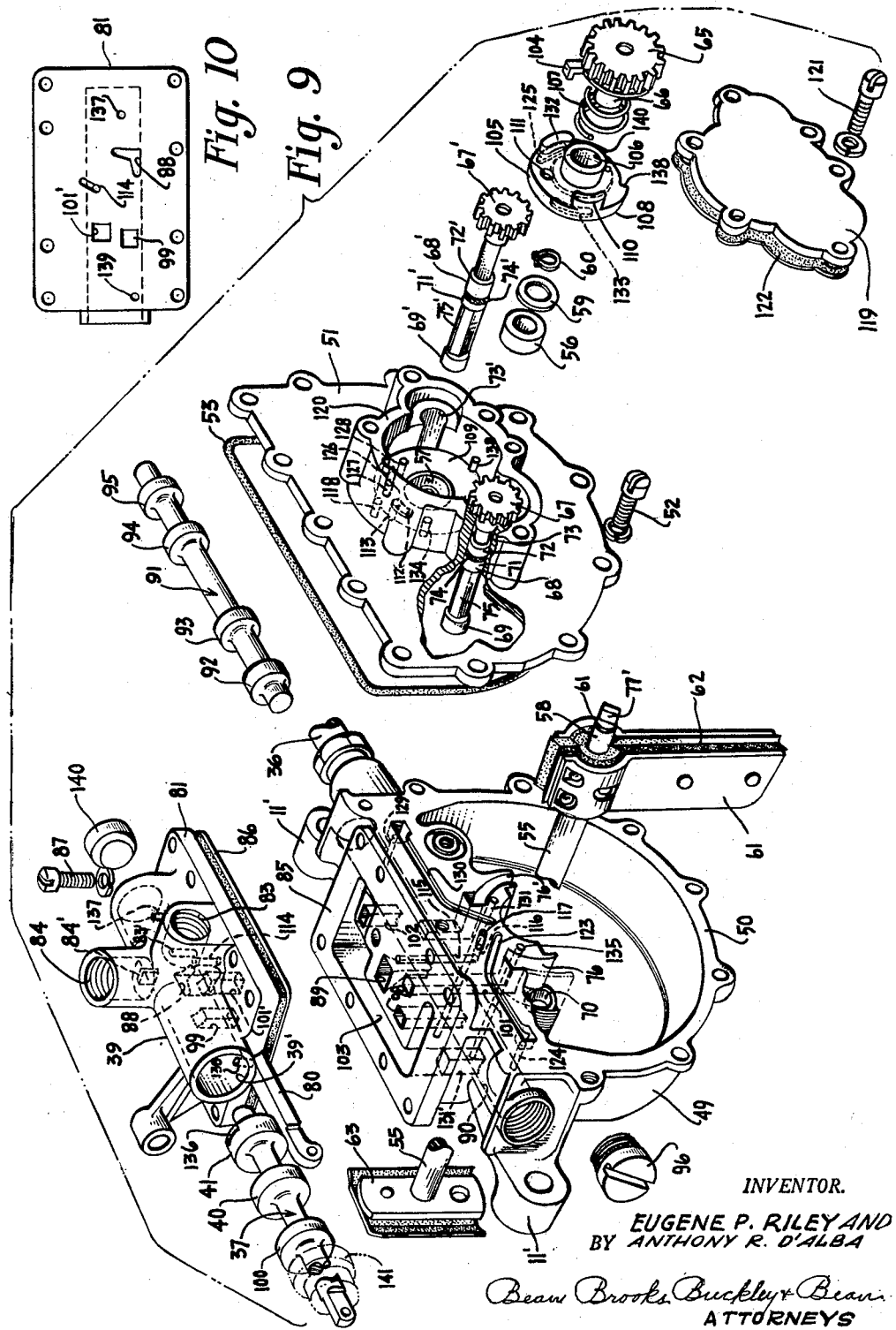

United States Patent Office 3,153,985
Patented Oct. 27, 1964

3,153,985
WINDSHIELD WIPER
Eugene P. Riley, Boston, and Anthony R. D'Alba, Williamsville, N.Y., assignors to Trico Products Corporation, Buffalo, N.Y.
Filed Apr. 6, 1959, Ser. No. 804,491
10 Claims. (Cl. 91—264)

The present invention relates to an improved hydraulic windshield wiper system and an improved hydraulic wiper motor therefor.

It is one object of the present invention to provide an improved hydraulically actuated reversing type of windshield wiper motor which utilizes a dual coordinated valving action to positively provide a gradual decrease of piston speed prior to piston reversal and a gradual increase in piston speed during the initial portion of piston movement after piston reversal, thereby always gradually overcoming the inertia of all of the moving parts of the wiper system and producing smooth operation of the entire wiper system in which the motor operates.

The wiper motor of the present invention produces smooth, quiet operation by utilizing dual coordinated valving therein which gradually increases the flow from a pump into a first chamber on one side of the motor piston while substantially simultaneously gradually increasing the flow out of a second chamber on the other side of the piston when the piston movement is initially started from its end point of travel, thereby providing for a positively controlled gradual increase in speed of the wiper motor from a stopped position. Furthermore, the same dual coordinated valving also gradually reduces the flow of hydraulic fluid to said first chamber of the motor and substantially simultaneously gradually reduces the flow of hydraulic fluid from said second chamber during the terminal portion of motor piston travel, thereby providing a positively controlled gradual dampening of piston movement prior to reversal thereof. In view of the foregoing action, a smooth stopping and starting of the wiper motor piston is positively realized by the foregoing dual coordinated valve action both prior to and after its reversal, respectively, thereby greatly minimizing shock to the linkages of the system due to inertia and, in turn, prolonging their life.

Another object of the present invention is to provide a hydraulic windshield wiper system including the above-described motor wherein, prior to motor reversal, the gradual reducing of fluid flow through the wiper motor is accompanied by a substantially simultaneous gradual reduction of flow of hydraulic fluid in the conduits leading to the wiper motor while maintaining the pressure in these conduits substantially constant, and subsequent to the reversal of the motor, the gradual increasing of fluid flow through the motor is accompanied by a substantially simultaneous gradual increase of fluid flow through the conduits leading to the motor while maintaining the pressure therein substantially constant, thereby greatly minimizing hydraulic shock in the system and enhancing smooth flow of hydraulic fluid through the system, thereby, in turn, reducing noise, prolonging the life of the system components and reducing the cost of the system by permitting light-weight materials to be utilized.

In accordance with the present invention, the improved windshield wiper system incorporating the above-described improved motor includes a pump and a variable flow by-pass valve interposed therebetween. Depending on the position of the above-described valving in the motor, the by-pass valve by-passes a varying amount of fluid around the motor to a reservoir which supplies the pump in order to maintain the pressure to the motor substantially constant. More specifically, the by-pass valve by-passes a greater amount of fluid to the reservoir when the dual coordinated valving in the motor is closed than when it is open. As the valving within the motor gradually opens and closes, depending on the position of the motor piston, the above-described by-pass valve will gradually route more and less fluid, respectively, to the motor. A reversing valve within the motor reverses the flow to the chambers on either side of the piston at the end of piston travel, and, in so doing, must momentarily shut off the flow of hydraulic fluid to and from the motor. However, since the flow of hydraulic fluid to the motor is greatly decreased in a gradual manner prior to actuation of the reversing valve to effect reversal of the motor and during the initial portion of piston travel, it will readily be seen that there are no abrupt changes in the force produced by the hydraulic fluid being supplied to the motor and therefore hydraulic shock in the entire system including the motor, the pump, and all of the elements therebetween, is greatly lessened. The attendant advantages of lessening the hydraulic shock to the system include the ability to make the system of lighter-weight materials, thereby reducing its cost, and the prolonging of the life of the system because the hydraulic shock effect is greatly lessened. Furthermore, the hydraulic system is very smooth and quiet in operation. In addition to the foregoing, the gradual throttling of hydraulic fluid to the motor both prior to and after reversal of the piston causes the above-mentioned by-pass valve to gradually vary the rate at which fluid is by-passing the motor while maintaining the pressure to the motor substantially constant thereby obviating hunting of the by-pass valve, which, in turn, insures supplying of the motor with hydraulic fluid under a constant pressure thereby enhancing smooth operation of the entire system. The present invention will be more fully understood when the following portions of the specification are read in conjunction with the accompanying drawings wherein:

FIG. 1 is a fragmentary perspective view of a vehicle mounting the improved hydraulic wiper system of the present invention;

FIG. 2 is an elevational view, partially broken away, showing the improved wiper motor of the present invention;

FIG. 3 is a view within the motor taken along line III—III of FIG. 2;

FIG. 4 is a view of certain of the porting within the motor taken along line IV—IV of FIG. 2;

FIG. 5 is a view (partially in cross-section) of the main on-off valve for the motor taken along line V—V of FIG. 2;

FIG. 6 is a schematic diagram of the system, particularly showing the main on-off valve for the motor in an on position and also showing the by-pass valve in the system which coacts with the motor to reduce hydraulic shock and enhance smooth operation of the system;

FIG. 7 is a schematic view of the main on-off control valve for the motor shown in FIG. 6 in an off position;

FIG. 9 is an exploded view in perspective of the various parts of the motor; and FIG. 10 is a plain view of the under side of the main on-off control valve housing shown in FIG. 9.

Figure 8:
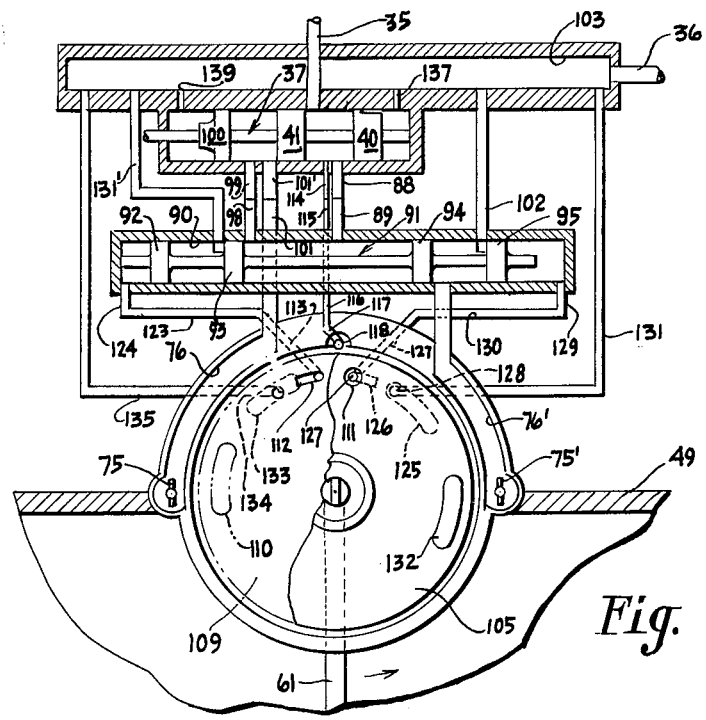
FIG. 8 is a schematic view showing the fluid circuits of the motor and the position of the valving when the piston is moving counterclockwise.

Reference is now made to FIG. 1 wherein an automotive vehicle 10 is shown having a windshield 11 mounted thereon in the conventional manner. Suitably mounted on the engine firewall or underneath the instrument panel of the vehicle by lugs 11' (FIG. 3) is a hydraulic motor 12 having suitable connecting means such as a drum (not shown) mounted on the portion of the motor shaft which extends rearwardly from the motor. A suitable drive such as cables 13 and 14 couple the motor shaft to pulleys 15 and 16, respectively, mounted on rockshafts (not numbered) which, in turn, mount wiper arms 17 and 18 respectively, which carry wiper blades 19. A manual control 20 is mounted on the vehicle dashboard and is coupled to motor 12 by a Bowden wire 21 for the purpose of permitting selective actuation of the motor. As is well understood in the art, when motor 12 is caused to oscillate, wiper blades 19 will be driven back and forth in arcuate paths across the portion of the windshield to be cleared.

During motor operation, hydraulic fluid under pressure is supplied to motor 12 by pump 22 which is suitably mounted proximate engine 23 and is driven therefrom by a drive which may include belt 24' driven from a rotating part of the engine. A reservoir 24 supplies fluid to pump 22 through conduit 25. Thereafter, the fluid moved by pump 22 may travel through conduit 26 to a suitable accessory 27 or may by-pass accessory 27 through conduit 28 and pass through conduit 29 to flow regulating valve 30 to be described in detail hereafter. A portion of the hydraulic fluid passing through flow regulating valve 30 is intended to pass through conduit 31, fitting 32 and conduit 33 to thereby return to reservoir 24. Another portion of the fluid passing through flow regulating valve 30 passes through conduit 35, through the operating parts of motor 12, as described in detail hereafter, and then through motor exhaust conduit 36 from which it returns to reservoir 24. The accessory 27 which is driven by pump 22 may be a power steering device, such as shown in copending application Ser. No. 790,248, filed January 30, 1959, or may be any other type of accessory which is driven by hydraulic fluid.

Flow regulating valve 30 permits a variable amount of fluid to flow to motor 12, but maintains the pressure of this fluid substantially constant. Insofar as pertinent at this point, when motor slide valve 37 is placed in the "on" condition shown in FIG. 6, hydraulic fluid passes from chamber 38 of valve 30 through conduit 35 which leads to the portion of control housing 39 which is between lands 40 and 41 of spool valve 37. This fluid then passes through conduit 42 which is in communication with chamber 43 of flow regulating valve 30. The pressure of the hydraulic fluid in chambers 38 and 43 is substantially equal. However, since the surface area of piston 44 is greater than that of piston 45, the piston assembly including pistons 44, 45, and spring 46 will be caused to move downwardly because of the greater total force on the surface of piston 44 than on the surface of piston 45. As this downward movement progresses, the lower surface 47 of piston 45 will progressively restrict the opening of conduit 31 in communication with chamber 38 and thereby cause the pressure in conduit 35 leading to wiper motor 12 to be built up. This progressive downward movement of piston assembly 44–46–45 continues until the under side of piston 44 seats on shoulder 48 of valve 30. Thereafter spring 46 which separates piston 44 and 45 will permit the latter to move upwardly and downwardly with fluctuations in pressure in chamber 38 to cause fluid at a substantially constant pressure to be supplied to motor 12, as described in greater detail hereafter. However, it is to be noted that as flow through the motor 12 is restricted, the pressure within chamber 38 will tend to increase and piston 45 will be elevated to open the aperture of conduit 31 thereby permitting a greater percentage of hydraulic fluid to by-pass motor 12 than when flow through the motor is relatively unrestricted.

As mentioned briefly above, motor 12 is of the type which gradually restricts the flow of fluid thereto at the terminal portion of piston travel and gradually permits a greater flow of hydraulic fluid thereto at the initial portion of piston travel after reversal. The above-described action of flow regulating valve 30 follows the action of motor 12. More specifically, as motor 12 varies the flow of hydraulic fluid thereto, piston 45 of valve 30 will gradually increase the amount of fluid which is bypassing the motor. Therefore, hydraulic ram which would otherwise be present incidental to the shutting off of hydraulic fluid flow to the motor during shuttle valve reversal is therefore greatly minimized because the flow of hydraulic fluid to the motor is shut off gradually, and valve 30 permits the hydraulic fluid which is being pumped by pump 22 to by-pass motor 12. In addition, as the valving within motor 12 gradually opens to permit hydraulic fluid to enter the wiper motor after piston reversal, piston 45 of valve 30 will permit the flow of hydraulic fluid to motor 12 to increase gradually as it moves downwardly to its position shown in FIG. 6. Because of the gradual reducing and increasing of flow, which is effected by the mechanism within the motor, and because piston 45 follows this flow change in a gradual manner to maintain the pressure of the hydraulic fluid to the motor substantially constant, smooth motor operation is greatly enhanced because of the virtual elimination of abrupt changes in hydraulic pressure being supplied to the motor. Furthermore, the gradual movement of piston 45 virtually eliminates "hunting" thereof, thereby insuring that the pressure of hydraulic fluid to the motor is maintained substantially constant.

The improved motor of the present invention consists of a housing 49 having an open side bordered by rim 50 which is adapted to receive a cover plate 51, which is secured to said housing by screws 52 which fit in aligned apertures (not numbered) in the housing and the cover plate. A gasket 53 (FIGS. 3 and 9) provides fluid tight sealing between the housing and the cover plate. The rear of housing 49 (FIG. 3) contains a bearing 54 for journaling one end of motor shaft 55, and cover plate 51 is adapted to receive a bearing 56 in aperture 57 for journaling the other end 58 of shaft 55. A thrust washer 59 is interposed between bearing 56 and snap ring 60, which is received in groove 61 on the end of shaft 55. Mounted, as by a press fit, between the ends of shaft 55 is a piston 61. A sealing packing 62 of synthetic rubber or the like fits within a groove in the edge of piston 61 (FIG. 3) for insuring good sealing contact between the walls of the chamber defined by housing 49 and cover 51 and the piston. Mounted on the end of shaft 55, is a fitting 63 for coupling a shaft to a suitable link arrangement which transmits motion to the windshield wipers. The fitting 63 shown in FIG. 9 may be received by a channel member (not shown) journaled in a bracket, or, in lieu of fitting 63, a drum may be used for driving cables, as described above relative to FIG. 1.

As can readily be appreciated from the foregoing description, piston 61 always divides the inside of the motor housing into two chambers. One of these chambers always receives high pressure fluid from the pump and the other of the chambers exhausts low pressure fluid to the reservoir, as is well known in the art. In order to provide a substantially simultaneous reduction of hydraulic fluid flow into one of the chambers and out of the other of the chambers prior to motor reversal, and in order to provide gradually increased flow into one of the chambers and out of the other of the chambers immediately after piston reversal, the following structure is provided, it being understood that the gradual decrease and increase of flow through the motor is accompanied by a gradual decrease and increase in piston speed, respectively.

As can be seen from FIGS. 3 and 9, a central gear 65 has a hollow bushing 66 formed integrally therewith. This bushing is adapted to be keyed to the reduced end portion 77' of shaft 55 as by male and female non-circular mating configurations. Pinions 67 and 67' are securely mounted on flow regulating valve shafts 68 and 68', respectively. The cylindrical ends 69 and 69' of shafts 68 and 68', respectively, are journaled in cylindrical apertures 70 and 70' (FIG. 3), respectively, in housing 49. The cylindrical sections 71–72 and 71'–72' are journaled in cylindrical apertures 73 and 73', respectively, in cover plate 51. Seals 74 and 74' are positioned in the space between portions 71–72 and 71'–72', respectively, of shafts 68 and 68'. Positioned between cylindrical portions 69 and 71 of shaft 68 and their counterparts of shaft 68', are valves 75 and 75', respectively, (FIGS. 2, 3, and 9), which are positioned in ducts 76 and 76' in housing 49. As can be seen from FIG. 2, valves 75–75' are of a substantially diamond-shaped configuration and, in the position shown in this figure, are in a full open position. During oscillation of piston 62 back and forth in the well known manner, gear 65 will oscillate correspondingly. Since gear 65 is in mesh with pinions 67 and 67', valves 75 and 75' will permit maximum flow through ducts 76 and 76', respectively, when piston 61 is in its central position shown in FIG. 2. However, as piston 61 approaches the terminal portion of its movement, valves 75 and 75' will gradually decrease the opening in ducts 76 and 76' through which hydraulic fluid is supplied to and exhausted from motor 12. On the other hand, immediately after reversal of piston 61 is effected, as described in detail hereafter, the engagement between gear 65 and pinions 67—67' will cause valves 75 and 75' to gradually open the conduits 76 and 76' through which fluid flows, thereby permitting gradual increase in speed of motor piston 61 after piston reversal. As noted above, this gradual decreasing of piston speed prior to piston reversal and gradual increasing of piston speed subsequent to piston reversal causes a gradual decelerating and accelerating, respectively, of not only the motor but all of the linkages and wiper equipment driven thereby, thereby always gradually overcoming the inertia of the wiper system. It will further be noted that the flow of hydraulic fluid to and from the motor is acted on substantially simultaneously by the above-described flow regulating equipment thereby providing a dual type of action to insure the above-described efficient inertia overcoming type of operation.

In order to start motor 12, Bowden wire control 20 is manipulated to cause core 77 thereof (FIGS. 2, 6, and 7) to pivot lever 78 clockwise from the position shown in FIG. 7 to the position shown in FIG. 6. This pivotal movement is effected about pin 79 mounted in arm 80, which extends from hose 81 of motor control housing 39. This will cause rod 82, which is an extension of spool valve 37 and which is pinned to lever 78 at 83″, to cause spool valve 37 to move within chamber 39' of control housing 39 from the position shown in FIG. 7 to the position shown in FIGS. 5 and 6. As this movement of spool valve 37 is effected, land 41 will permit flow of hydraulic fluid from conduit 35 through apertures 83 and 83' (FIGS. 5 and 9) and into the space between lands 40 and 41 of valve 37. Thereafter, this hydraulic fluid will actuate flow regulating valve 30 in the manner described in detail above. In this respect, it will be noted that apertures 84 and 84' (FIG. 9) of motor control housing 39 are in communication with conduit 42.

Motor control housing 39 has a base 81 which is adapted to fit on a mating base 85 (FIG. 9) of housing 49, with a suitable gasket 86 interposed therebetween. Screws 87 are adapted to fit between aligned apertures (not numbered) in control housing 39 and motor housing 49 to secure the former securely in position. When parts 39 and 49 are thus assembled, certain conduits therein, which will be described in detail hereafter, will be in alignment.

When control valve 37 has been moved to the position shown in FIGS. 5 and 6, hydraulic fluid in conduit 35 (FIG. 6) may pass into conduit 88 in control valve housing 39 and then into conduit 89 (FIGS. 2, 4, 8 and 9) in motor housing 49. The end of conduit 89 which is remote from conduit 88 is in communication with shuttle valve chamber 90 in which shuttle valve 91, having lands 92, 93, 94, and 95 thereon, is adapted to reciprocate. One end of shuttle valve chamber 90 is adapted to be closed by threaded plug 96 and the other end by threaded plug 96' (FIG. 2). Suitable sealing elements (not shown) may be provided between the plugs and the motor housing 49.

During operation, when motor piston 61 is traveling in a counterclockwise direction in FIGS. 2 and 8, the high pressure fluid which is supplied through conduit 35 (FIG. 1) and passes through conduits 88 and 89 of motor 12, passes into the portion of shuttle valve chamber 90 which is between lands 93 and 94 (FIGS. 2 and 8) of shuttle valve 91. Thereafter, the high pressure hydraulic fluid passes into the lower end of conduit 98, conduit 99, the portion of control housing chamber between lands 40 and 100, conduits 101' and 101, the lower end of the latter being in communication with conduit 76 in which valve 75 is located. The admission of fluid under relatively high pressure into the chamber to the left of piston 61 (FIG. 2) causes piston 61 to move in a counterclockwise direction, as described above.

While piston 61 is moving in a counterclockwise direction, the hydraulic fluid to the right thereof must be exhausted to reservoir 24. This is achieved in the following manner: The hydraulic fluid in the chamber to the right of piston 61 is forced upwardly through conduit 76' (FIGS. 2, 3, 8 and 9), through the portion of shuttle valve chamber 90 which is between lands 94 and 95 of shuttle valve 91 (FIG. 2), through conduit 102 (FIGS. 2, 4, 8 and 9), and then into exhaust manifold 103 which is in communication with conduit 36 leading to reservoir 24 (FIG. 1).

In order to cause reversal of piston 61 after it has reached its end of counterclockwise motion, a pilot valve arrangement is provided for changing the position of shuttle valve 91 in chamber 90 thereby rerouting the flow of hydraulic fluid to the motor chambers. It will, of course, be appreciated, as described in detail above, that piston speed is reduced prior to reversal because of the joint action of valves 75 and 75', which restrict the flow of fluid into and out of the motor. As the piston 61 continues its movement in a counterclockwise direction, gear 65 will also move in a counterclockwise direction. A kicker 104 (FIG. 9) is rigidly secured to the rear of gear 65. A pilot valve 105 has a bore 106 therein which is adapted to receive hollow bushing 66 therein (FIG. 3) so that there may be relative rotation therebetween. A spring 107 is interposed between pilot valve 105 and the rear of gear 65 to cause the rear face 108 of valve 105 to be firmly seated on face 109 of cover 51. As piston 61 approaches the end of its counterclockwise movement, kicker 104 will engage lug 110 on pilot valve 105 and pivot the pilot valve in a counterclockwise direction. This will cause aperture 111 in pilot valve 105 to be superimposed over groove 112 (FIG. 8A) in valve face 109, groove 112 being in communication with conduit 113. When this positioning of valve 105 is effected, high pressure hydraulic fluid will pass through the folowing path to move shuttle valve 91 to the right from its position shown in FIG. 8 to its position shown in FIG. 8A: The high pressure hydraulic fluid between lands 40 and 41 of control valve 37 (FIG. 2) will pass into conduit 114 (FIGS. 2, 8, and 9) in control head 39 into conduit 115 in housing 49 and then into conduit 116 in communication therewith. Conduit 116 in turn terminates in a groove 117 on the face of housing 49 (FIGS. 2, 8, and 9) which is adapted to permit the hydraulic fluid therein to pass into conduit 118 in cover 51. As can be seen from FIGS. 2, 8, 8A, and 9, conduit 118 permits high pressure fluid from conduit 118 to enter the chamber in which gears 65, 67, and 67' are housed, this chamber being fluid-tight because cover plate 119 is adapted to be rigidly secured on rim 120 of plate 51 by screws 121 fitting through aligned apertures (not numbered), a gasket 122 insuring fluid tightness.

Figure 8A:
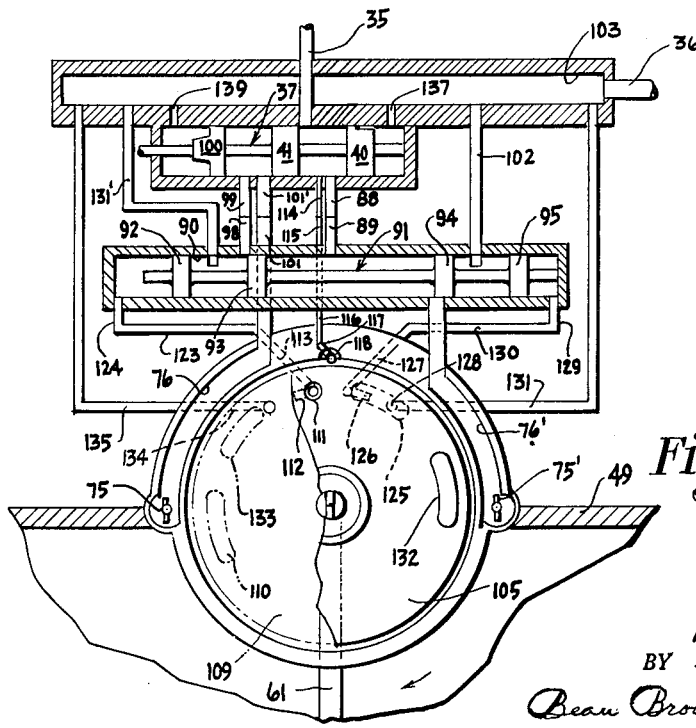
FIG. 8a is a schematic view showing the fluid circuits of the motor and the position of the valving when the motor piston is moving clockwise.

As noted above, when pilot valve 105 is moved to the position shown in FIG. 8A, high pressure fluid within the gear housing will pass through aperture 111 in the pilot shuttle 105 and into groove 112 and conduit 113 in the cover 51. Conduit 113, in turn, is in communication with groove 123 in the face of housing 49 (FIGS. 2 and 9) which conducts the hydraulic fluid to conduit 124 from whence it passes into the portion of the shuttle valve chamber 90 to the left of land 92 (FIG. 2). The high pressure fluid to the left of land 92 will cause shuttle valve 91 to move to the right, because the movement of pilot valve 105 in the above-described manner permits the hydraulic fluid, which was previously in the portion of shuttle valve chamber 90 to the right of land 95 (FIG. 2) to be exhausted to the conduit 36 leading to the fluid reservoir. More specifically, when shuttle valve 105 assumes the position shown in FIG. 8A, groove 125 causes communication between groove 126 (which is in communication with conduit 127) and conduit 128. This being the case, the hydraulic fluid to the right of land 95 may therefore pass through conduit 129 (FIGS. 2, 8, and 9), groove 130 in the face of housing 49, conduit 127, groove 126 in face 109, groove 125 in valve 105, conduit 128, and conduit 131 in housing 49, to exhaust manifold 103. Since high pressure fluid is supplied to the left of land 92 of shuttle valve 91, and since the hydraulic fluid to the right of land 95 is permitted to be exhausted in the above manner, shuttle valve 91 will move to the right in shuttle valve chamber 90 to reverse the direction of travel of piston 61. After shuttle valve 91 has moved to the right, it occupies the position shown in FIG. 8A. Therefore, high pressure hydraulic fluid from conduit 35, which flows between lands 40 and 41 of control valve 37, will pass into conduits 88 and 89, the portion of shuttle valve chamber between lands 93 and 94, and conduit 76' in communication with the chamber to the right of piston 61. The hydraulic fluid to the left of piston 61 will be exhausted to reservoir 24 through conduits 76, 101, 101', the portion of control valve chamber between lands 41 and 100, conduits 99 and 98, the portion of shuttle valve chamber 90 between lands 92 and 93, and conduit 131' to exhaust manifold 103, which is in communication with conduit 36 leading to the reservoir 24.

The foregoing action of supplying the chamber to the right of piston 61 with high pressure fluid and exhausting the hydraulic fluid from the chamber to the left of piston 61, causes clockwise movement of the piston. As explained in detail above, because of the connection between gear 65 and pinions 67 and 67', the valves 75 and 75' will gradually increase the flow of hydraulic fluid into and out of the motor immediately after reversal, and will gradually decrease the flow of hydraulic fluid into and out of the motor as piston 61 reaches its terminal portion of clockwise travel. Prior to reversal, kicker 104 (FIG. 9) will engage protuberance 132 on pilot valve 105 and move it in a clockwise direction to the position shown in FIG. 8. The high pressure fluid existing in conduit 118 will therefore be conducted to the gear chamber, as explained above, and will thereafter pass through aperture 111 in valve 105 and then through groove 125, conduit 127, groove 130 in the face of housing 49, and conduit 129 to the shuttle valve chamber to the right of land 95. Simultaneously, the hydraulic fluid to the left of land 92 will be exhausted to the reservoir through conduit 124, groove 123 in the face of housing 49, groove 133 in the rear of valve 105, and conduits 134–5. The unbalance of hydraulic fluid pressure on shuttle valve 91 will cause it to move to the left and therefore shuttle valve 91 will again be in a position wherein it causes high pressure hydraulic fluid to be supplied to the left of piston 61 in the above-described manner.

From the foregoing description, it can readily be seen that piston 61 is caused to travel back and forth while control valve 37 is in the position shown in FIGS. 2 and 5. Whenever it is desired to terminate operation of motor 12, control 20 is manipulated to cause the core of Bowden wire unit 21 to move control valve 37 to the position shown in FIG. 7. When this occurs, land 41 will obstruct the portion of aperture 83' of control housing 81 which is in communication with control chamber 39' to shut off the flow of hydraulic fluid through conduit 88 (FIG. 5) leading to the inside of motor 12. However, it will be noted that a slightly cutaway portion 136 is formed on land 41, and when control valve 37 is moved to its off position in FIG. 7, cutaway 136 permits metering of fluid from chamber 43 of valve 30 through conduit 42. The chamber to the right of land 41 is in communication with exhaust manifold 103 through bleed conduit 137 when valve 137 is in the position shown in FIG. 7. Thus the pressure in chamber 38 of flow regulating valve 30 will force piston assembly 44–45–46 upwardly at a relatively slow controlled rate to cause the hydraulic fluid within chamber 43 to be bled back into conduit 36 leading to reservoir 24. The slow bleeding past cutaway 136 insures the maintaining of piston assembly 44–45–46 in its FIG. 6 position for a sufficiently long time to maintain operating pressure within conduit 35 leading to the motor 12 for sufficient time to insure prompt positive movement of piston 61 to its parked position, which is at the limit of its counterclockwise movement as viewed from FIG. 2.

When control valve 37 is moved to its position shown in FIG. 7, the chamber defined by lands 40 and 41 within control chamber 39' is in communication with the chamber to the left of piston 61 through conduits 101' and 101. Thus a direct communication of high pressure hydraulic fluid with this motor chamber causes piston 61 to assume its full counterclockwise position, and as piston 45 (FIG. 6) retracts to lessen the pressure in conduit 35 leading to motor 12, as described in detail above, the pressure within the motor housing is reduced correspondingly.

When piston 61 moves to its parked position in the above-described manner, kicker 104 (FIG. 9) will cause pilot valve 105 to assume its full counterclockwise position also (FIG. 8A). This will permit high pressure hydraulic fluid to be placed in communication with the chamber to the left of land 92 within shuttle valve housing 90 and thereby move shuttle valve 91 to its position to the right as shown in FIG. 8A, as described in detail above, thereby placing shuttle valve 91 in position to cause motor piston 61 to immediately start clockwise movement as soon as control valve 37 is again returned to an on position shown in FIG. 6.

It is to be noted at this point that pilot valve 105 oscillates back and forth many times a minute during wiper motor operation at extremely large rates of acceleration. Therefore, in order to insure that it does not over-travel, a pin 138 (FIG. 9) is provided extending from valve face 109. Shoulders 139 and 140 on pilot valve 105 are adapted to alternately engage positive stop-pin 138 during motor operation to insure that there is no over-travel of this valve.

A bleed 139 (FIGS. 8, 8A, and 9) is provided between control chamber 39' and exhaust manifold 103 to permit any hydraulic fluid which seeps into the portion of the control chamber to the left of land 100 to be exhausted when control valve 37 is moved to the left to an off position. Furthermore, during motor operation, exhaust manifold 103 is full of hydraulic fluid at a low pressure. Bleed holes 137 and 139 permit the hydraulic fluid in the exhaust manifold to communicate with the chambers to the right of land 41 and to the left of land 100, respectively, to maintain equal forces on opposite sides of the control valve to prevent movement thereof during motor operation.

A plug 140 is press-fitted into the right end of control housing 39 and a sealing plug 141 fits about the shaft of valve 37 in the other end of control housing 39.

The motor 12 is parked in the following manner: As noted above, whenever piston movement is in a counterclockwise direction (FIG. 8), shuttle valve 91 will permit high pressure fluid to communicate with the chamber to the left of piston 61 through conduit 35, the space between lands 40 and 41 (when control 37 has been moved to its off position), conduits 101' and 101, and conduit 76. The low pressure hydraulic fluid to the right of piston 61 is exhausted through conduit 76', the space between lands 94 and 95, and conduit 102. If, however, piston 61 is moving in a clockwise direction (FIG. 8A), the hydraulic fluid takes the following path when control 37 is moved to its off position: The hydraulic fluid in conduit 35 passes between lands 40 and 41 of control 37 and into conduits 101', 101, and 76, to the chamber to the left of piston 61. However, since shuttle valve 91 is occupying its position shown in FIG. 8A, exhaust from the chamber to the right of piston 61 is effected through conduit 76', the chamber between lands 93 and 94, conduits 89 and 88, the chamber to the right of land 40 (because control 37 has been moved to the left) and bleed 137 to exhaust manifold 103. As noted above, when piston 61 reaches its limit of counterclockwise movement, pilot valve 105 will cause shuttle valve 91 to move back to its position in FIG. 8 preparatory to a subsequent motor starting operation.

While the present windshield wiper system has been depicted above in combination with a hydraulic power steering system or other hydraulic accessory on the vehicle, it will readily be understood that the present windshield wiper system may be utilized as a complete entity by itself without being used in conjunction with another type of hydraulic device.

It is to be noted that valves 75 and 75' have been described above as being substantially diamond-shaped in cross-section. The ideal configuration is an exact diamond-shape so that flow will immediately start through the conduits as soon as the valves open. However, for purposes of strength as well as ease in manufacturing, the valves 75 and 75' may have a slight flat portion at their tips. Furthermore, it is to be noted that valves 75 and 75' may be under-sized so as to permit slight leakage through conduits 76 and 76', respectively, when the valves are in their closed position in order to further minimize abrupt changes in hydraulic pressure within the system.

While a preferred embodiment of the present invention has been disclosed, it will readily be understood that the present invention is not limited thereto, but may be otherwise embodied within the scope of the following claims.

What is claimed is:

1. A hydraulic windshield wiper system comprising a pump, a reversing wiper motor, a variable flow by-pass valve for lessening hydraulic shock incidental to reversal of said motor by gradually varying the amount of hydraulic fluid which is by-passed around said motor, reservoir means for receiving by-passed fluid from said by-pass valve and exhaust fluid from said motor, said reservoir means serving as a source of fluid supply for said pump, said motor including a housing, a piston mounted for reversible movement in said housing, said piston dividing a portion of said housing into first and second chambers, first valving means and porting operatively associated with said motor for alternately routing pressurized hydraulic fluid from said pump to said first and second chambers while permitting fluid in the other of said chambers to be exhausted to said reservoir, and second valving means operable during the terminal portion of piston travel to gradually reduce the flow of fluid to said motor and operable during the initial portion of piston travel after reversal thereof to gradually increase the flow of hydraulic fluid to said motor, said gradual variation of fluid flow to said motor permitting gradual variation in the amount of fluid by-passed to said reservoir by said by-pass valve thereby both reducing the amount of hydraulic shock in said system due to operation of said first valving means in routing the flow of hydraulic fluid through said motor, and enhancing smooth operation of the system.

2. A hydraulic windshield wiper system comprising a pump, a reversing wiper motor, a variable flow by-pass valve for lessening hydraulic shock incidental to reversal of said motor by gradually varying the amount of hydraulic fluid which is by-passed around said motor, a reservoir for receiving by-passed fluid from said by-pass valve and exhaust fluid from said motor, said reservoir serving as a source of fluid supply for said pump, said motor including a housing, a piston mounted for reversible movement in said housing, said piston dividing said housing into first and second chambers, first valving means and porting operatively associated with said motor for alternately routing pressurized hydraulic fluid from said pump to said first and second chambers while permitting fluid in the other of said chambers to be exhausted to said reservoir, and second valving means for substantially simultaneously increasing the flow of hydraulic fluid into one of said chambers and out of the other of said chambers during the initial portion of piston travel to thereby gradually build up the speed of said piston at the beginning of a stroke and for substantially simultaneously restricting the flow of hydraulic fluid into said one of said chambers and restricting the flow of hydraulic fluid out of said other of said chambers at the terminal portion of piston travel to thereby gradually dampen piston movement prior to its reversal, said gradual variation by said second valving means of fluid supplied to said motor in combination with the gradual variation in the amount of fluid by-passed to said reservoir by said by-pass valve tending to both reduce the amount of hydraulic shock in said system due to the operation of said first valving means in routing the flow of hydraulic fluid through said motor, and enhancing smooth operation of said system.

3. A hydraulic windshield wiper system comprising a pump, a reversing wiper motor, by-pass means having an automatically variable aperture for varying the flow of hydraulic fluid to said motor, a reservoir for receiving by-passed fluid from said by-pass means and exhaust fluid from said motor, said reservoir serving as a source of fluid supply for said pump, said motor including a housing, a piston mounted for reversible movement in said housing, said piston dividing a portion of said housing into first and second chambers, first valving means and porting operatively associated with said motor for alternately routing pressurized hydraulic fluid from said by-pass means to said first and second chambers while permitting fluid in the other of said chambers to be exhausted to said reservoir, and means for gradually increasing the flow of hydraulic fluid to said motor during the initial part of piston movement to thereby gradually increase the speed of said piston and thereby substantially simultaneously cause said variable aperture of said by-pass means to effectively gradually decrease in size to gradually by-pass less hydraulic fluid to thereby gradually overcome the inertia opposing the motor in starting from a stopped condition, said means also gradually decreasing the flow of hydraulic fluid to said motor during the terminal portion of piston travel to thereby gradually dampen piston movement prior to reversal thereof and thereby substantially simultaneously cause said variable aperture of said by-pass means to effectively gradually increase in size to gradually by-pass a greater amount of hydraulic fluid supplied by said pump to thereby reduce the amount of hydraulic shock to said system due to the operation of said valving means in changing the routing of the hydraulic fluid through said motor.

4. A hydraulic windshield wiper system comprising a pump, a wiper motor, by-pass means having an automatically variable aperture for varying the flow of hydraulic fluid to said motor in response to motor requirements, a reservoir for receiving by-passed fluid from said by-pass means and exhaust fluid from said motor, said reservoir serving as a source of fluid supply for said pump, said motor including a housing, a piston mounted for reversible movement in said housing, said piston dividing a portion of said housing into first and second chambers, first valving means and porting operatively associated with said motor for alternately routing pressurized hydraulic fluid from said pump to said first and second chambers while permitting fluid in the other of said chambers to be exhausted to said reservoir, and means for gradually increasing the flow of hydraulic fluid to said motor during the initial part of piston movement to thereby gradually increase the speed of said piston and thereby substantially simultaneously cause said by-pass means to gradually supply a greater amount of hydraulic fluid to said motor to thereby gradually overcome the inertia opposing the motor in starting from a stopped position.

5. A hydraulic windshield wiper system comprising a pump, a reversing wiper motor, by-pass means having an automatically variable aperture for varying the flow of hydraulic fluid to said motor, a reservoir for receiving by-passed fluid from said by-pass means and exhaust fluid from said motor, said reservoir serving as a source of fluid supply for said pump, said motor including a housing, a piston mounted for reversible movement in said housing, said piston dividing a portion of said housing into first and second chambers, first valving means and porting operatively associated with said motor for alternately routing pressurized hydraulic fluid from said pump to said first and second chambers while permitting fluid in the other of said chambers to be exhausted to said reservoir, and means for gradually decreasing the flow of hydraulic fluid to said motor during the terminal portion of piston travel to thereby gradually dampen piston movement prior to reversal thereof and thereby substantially simultaneously cause said variable aperture of said by-pass means to effectively gradually increase in size to gradually by-pass a greater amount of hydraulic fluid supplied by said pump to thereby reduce the amount of hydraulic shock to said system due to the operation of said valving means in changing the routing of the hydraulic fluid through the motor during reversal.

6. A hydraulic windshield wiper system comprising a pump, a reversing motor adapted to be driven by said pump, means for gradually reducing the flow of hydraulic fluid to said motor prior to reversal thereof and for gradually increasing the flow of hydraulic fluid thereto subsequent to reversal thereof, and means for tending to maintain the pressure of hydraulic fluid supplied to said motor relatively constant regardless of said variations in flow during motor operation whereby smooth operation of said system is enhanced.

7. A hydraulic windshield wiper motor comprising a housing, a piston mounted for reversible movement in said housing, said piston dividing a portion of said housing into first and second chambers, first and second conduit means in communication with said first and second chambers, respectively, first valving means for alternately routing pressurized hydraulic fluid through said first and second conduits into said first and second chambers, respectively, while permitting the fluid in the other of said chambers to be exhausted through the conduit associated therewith, a first vane in said first conduit, a second vane in said second conduit, a shaft for mounting said piston, a gear fixedly secured to said shaft, second and third shafts for mounting said first and second vanes, respectively, said second and third shafts being journaled in said housing, second and third gears mounted on said second and third shafts, respectively, said second and third gears both being in driving engagement with said first gear, said second and third gears being so oriented with respect to said first gear so that said first and second vanes provide a substantial restriction to the flow of hydraulic fluid through said first and second conduits, respectively, at one end position of piston travel and gradually open said conduits as said piston moves away from said one end position of piston travel and thereafter gradually move to a position wherein they again provide a substantial restriction to the flow of hydraulic fluid through said first and second conduits at the opposite end of piston travel.

8. A hydraulic windshield wiper motor adapted to provide automatic high speed reversible operation, comprising a housing, a piston mounted for reversible movement in said housing, said piston dividing a portion of said housing into first and second chambers, first and second conduit means in communication with said first and second chambers, respectively, means operable in synchronism with piston movement for alternately routing pressurized hydraulic fluid through said first and second conduit means into said first and second chambers, respectively, while permitting the fluid in the other of said chambers to be exhausted through the conduit in communication therewith, first valve means associated with said first conduit means, second valve means associated with said second conduit means, and mechanical means coupling said first and second valve means to said piston for effecting a positive driving relationship therewith to cause said first and second valve means to gradually decrease the flow of hydraulic fluid through said first and second conduit means, respectively, prior to piston reversal and to gradually increase the flow of hydraulic fluid through said first and second conduit means subsequent to piston reversal, said positive driving of said first and second valve means by said piston being effected during both the flow decreasing and flow increasing action thereof to thereby assure absolute synchronism in operation of said first and second valve means and said piston during high speed operation of said motor.

9. A hydraulic windshield wiper motor as set forth in claim 8 wherein said mechanical means effectively interlock said piston with said first and second valve means to preclude independent movement of said first and second valve means relative to said piston.

10. A hydraulic windshield wiper motor as set forth in claim 9 wherein said mechanical means comprise a gear and pinion connection between said piston and said first and second valve means.

References Cited in the file of this patent

UNITED STATES PATENTS

| | | |
|---|---|---|
| 2,164,876 | Horlacher | July 4, 1939 |
| 2,292,336 | Farnham | Aug. 4, 1942 |
| 2,518,871 | Craig | Aug. 15, 1950 |
| 2,802,232 | Oishei et al. | Aug. 13, 1957 |
| 2,847,978 | Kelley et al. | Aug. 19, 1958 |
| 2,985,903 | Oishei et al. | May 30, 1961 |

FOREIGN PATENTS

| | | |
|---|---|---|
| 799,801 | Great Britain | Aug. 13, 1958 |